(12) United States Patent
Boshev et al.

(10) Patent No.: US 12,050,924 B2
(45) Date of Patent: Jul. 30, 2024

(54) DYNAMIC CONFIGURATION OF ACCESS RESTRICTIONS FOR AN APPLICATION IN RELATION TO DATABASES RUNNING IN A CLOUD ENVIRONMENT

(71) Applicant: SAP SE, Walldorf (DE)

(72) Inventors: Stoyan Zhivkov Boshev, Sofia (BG); Diyan Asparuhov Yordanov, Sofia (BG)

(73) Assignee: SAP SE, Walldorf (DE)

( * ) Notice: Subject to any disclaimer, the term of this patent is extended or adjusted under 35 U.S.C. 154(b) by 697 days.

(21) Appl. No.: 17/098,618

(22) Filed: Nov. 16, 2020

(65) Prior Publication Data
US 2022/0156100 A1    May 19, 2022

(51) Int. Cl.
| G06F 16/25 | (2019.01) |
| G06F 9/455 | (2018.01) |
| G06F 21/62 | (2013.01) |
| H04L 9/40 | (2022.01) |

(Continued)

(52) U.S. Cl.
CPC ........ *G06F 9/45558* (2013.01); *G06F 16/252* (2019.01); *G06F 21/6218* (2013.01); *H04L 41/0803* (2013.01); *H04L 63/02* (2013.01); *H04L 63/20* (2013.01); *H04L 67/10* (2013.01); *G06F 2009/45562* (2013.01); *G06F 2009/45587* (2013.01)

(58) Field of Classification Search
CPC .............. G06F 9/45558; G06F 16/252; G06F 21/6218; G06F 2009/45587; H04L 41/0803; H04L 63/02; H04L 63/20; H04L 67/10
See application file for complete search history.

(56) References Cited

U.S. PATENT DOCUMENTS 9,225,707 B1 * 12/2015 de Sousa ............... H04L 63/08
9,432,398 B2    8/2016 Iliev et al.
9,602,521 B2    3/2017 Iliev et al.
(Continued)

OTHER PUBLICATIONS

U.S. Appl. No. 17/067,223, filed Oct. 9, 2020, Boshev.
U.S. Appl. No. 17/068,245, filed Oct. 12, 2020, Boshev.

*Primary Examiner* — William G Trost, IV
*Assistant Examiner* — Adam A Cooney
(74) *Attorney, Agent, or Firm* — Fish & Richardson P.C.

(57) ABSTRACT

The present disclosure relates to computer-implemented methods, software, and systems for dynamic configuration of access restrictions on an application in relation to databases running in a cloud environment. An instruction to run an application is received by a virtual machine (VM) manager. The VM manager retrieves from a database manager information identifying databases accessible to the application. The databases are associated with at least one account of the application. The VM manager sends configuration instructions to dynamically configure a particular VM at which the application is to run. The particular VM is configured based on the configuration instructions that are generated based on the retrieved information and include rules for accessing the one or more databases identified in the retrieved information. The rules identify each database by its respective network address, and wherein the rules cause the particular VM to allow the application to access the one or more databases.

19 Claims, 6 Drawing Sheets

(51) Int. Cl.
*H04L 41/0803* (2022.01)
*H04L 67/10* (2022.01)

(56) References Cited

U.S. PATENT DOCUMENTS

| | | | |
|---|---|---|---|
| 9,826,035 B2 | 11/2017 | Genevski et al. | |
| 10,275,346 B2 | 4/2019 | Boshev et al. | |
| 10,528,624 B2 | 1/2020 | Boshev | |
| 10,623,390 B1* | 4/2020 | Rosenhouse | H04L 67/10 |
| 10,728,106 B1* | 7/2020 | Hartley | H04L 41/0896 |
| 2009/0313620 A1* | 12/2009 | Sedukhin | G06F 8/61 |
| | | | 718/1 |
| 2011/0208695 A1* | 8/2011 | Anand | G11B 27/002 |
| | | | 707/610 |
| 2016/0359862 A1* | 12/2016 | Riva | H04W 12/088 |
| 2017/0026469 A1* | 1/2017 | Usgaonkar | G06F 9/45558 |
| 2018/0101324 A1* | 4/2018 | Sharma | G06F 16/29 |
| 2019/0286832 A1* | 9/2019 | Szeto | H04W 12/082 |
| 2020/0117743 A1* | 4/2020 | Shilimkar | G06F 9/45558 |
| 2021/0191744 A1* | 6/2021 | Semmandampalayam | |
| | | | H04L 67/10 |
| 2021/0365577 A1* | 11/2021 | Acharya | G06F 21/629 |
| 2022/0147646 A1* | 5/2022 | Child | G06F 21/6218 |

* cited by examiner

DYNAMIC CONFIGURATION OF ACCESS RESTRICTIONS FOR AN APPLICATION IN RELATION TO DATABASES RUNNING IN A CLOUD ENVIRONMENT

TECHNICAL FIELD

The present disclosure relates to computer-implemented methods, software, and systems for data processing in a platform environment.

BACKGROUND

Software complexity is increasing and causes changes in the software product cycles, requirements, and possibilities for delivery of software applications and platform systems. Customer's needs are transforming, with increased requests for flexibility in terms of processes, landscape, and software components. Development of new software applications often times relies on existing, previously developed functionality, data, or configurations, or on integrations between software applications to perform more complex use cases. There are a number of scenarios where software components or applications are provided with access to multiple databases as they can be reused or relevant for the application as they are associated with a given customer, partner, developer, or consultant, among others. Providing access to a database in a cloud environment may be associated with security requirements that are relevant for imposing access restrictions, which may be associated with a customer, an application, or other identifying or grouping criteria.

SUMMARY

The present disclosure involves systems, software, and computer implemented methods for dynamic configuration of access restrictions on an application in relation to databases running in a cloud environment. In some instances, through the configured access restrictions, data isolation between applications and databases in the cloud environment can be managed. The data isolation may be associated with implementing access restriction requirements for an application running in the cloud to one or more databases from those running in the cloud that are associated with an account of the application.

One example method may include operations such as receiving, by a virtual machine (VM) manager, an instruction to run an application; retrieving, by the VM manager and from a database manager, information identifying one or more databases accessible to the application, wherein the one or more databases are associated with at least one account of the application; and sending, by the VM manager, configuration instructions to dynamically configure a particular VM at which the application is to run, wherein the particular VM is configured based on the configuration instructions, wherein the configuration instructions are generated based on the retrieved information and include rules for accessing the one or more databases identified in the retrieved information, wherein the rules identify each database by its respective network address, and wherein the rules cause the particular VM to allow the application to access the one or more databases. Other implementations of this aspect include corresponding systems, apparatus, and computer programs, configured to perform the actions of the methods, encoded on computer storage devices.

Implementations can optionally include dynamically configuring, by the VM manager, the particular VM to allow the application to run on the particular VM to access the one or more databases.

In some instances, the database manager identifies the one or more databases as being associated with the account of the application, wherein the one or more databases are identified from a plurality of databases running in a database network segment, the plurality of databases associated with a plurality of accounts including the account of the application.

Implementations can optionally include that the VM manager provides to a user, associated with the received instruction to run the application, a notification that the application is running on the particular VM.

In some instances, the VM manager manages lifecycles of a plurality of VMs running in an application network segment of a network, wherein each VM from the plurality of VMs hosts at least one application that consumes resources from a database network segment of the network.

In some instances, retrieving the information identifying the one or more databases accessible to the application comprises requesting, from the database manager, the information by providing an identifier of the account associated with the application, wherein the received instruction to run the application includes information identifying the account associated with the application; and in response to receiving the information identifying the one or more databases, generating the configuration instructions by creating the rules to include network addresses of the one or more databases and routing information for accessing at least one network where the one or more databases reside.

In some instances, the method may include applying, by the VM manager and at the particular VM where the application is run, access security policies by adding one or more records in a configuration table encoding the rules for configuring access to the one or more databases.

In some instances, the application runs in an application network segment including a plurality of applications, wherein the one or more databases run in a database network segment, and wherein the application network segment and the database network segment are isolated to communicate through a firewall.

In some instances, a database can be running at a database network segment. The database can be associated with a set of accounts and is accessible by a set of applications from a plurality of applications running in an application network segment, wherein the application network segment is communicatively coupled to the database network segment.

In some instances, the method includes receiving, at the VM manager and from a database manager, a first notification indicating that a new database is added in relation to the account of the application; and in response to receiving the first notification, sending, by the VM manager, instructions to update the rules configured for the application at the particular VM, wherein the instructions include a new rule for the new database to be added to existing configured rules for accessing databases from the application.

In some instances, the VM manager receives from a database manager a second notification indicating that a database from the one or more databases associated with the account of the application is removed. In response to receiving the second notification, sending, by the VM manager, instructions to update the rules configured for the application for accessing databases from the application at the particular VM, wherein the updated rules disable access to the removed database.

In some instances, the VM manager receives from a database manager, a third notification indicating that a database associated with a different account from the account of the application is shared with the account of the application. In response to receiving the third notification, sending, by the VM manager, instructions to update the rules configured for the application at the particular VM, wherein the instructions include a new rule for the shared database to be added to existing configured rules for accessing databases from the application.

In some instances, in response to receiving the notification, VMs associated with the account of the application are identified and a change in configuration of the identified VMs for accessing the VMs can be dynamically triggered.

In some instances, dynamically triggering the change in the configuration comprises: adding rules associated with the identified VMs, wherein the rules identify a network address of the new database that is added in relation to the account of the application; and adding rules defining a network address where the new database resides as an allowed network address for accessing by the VM.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
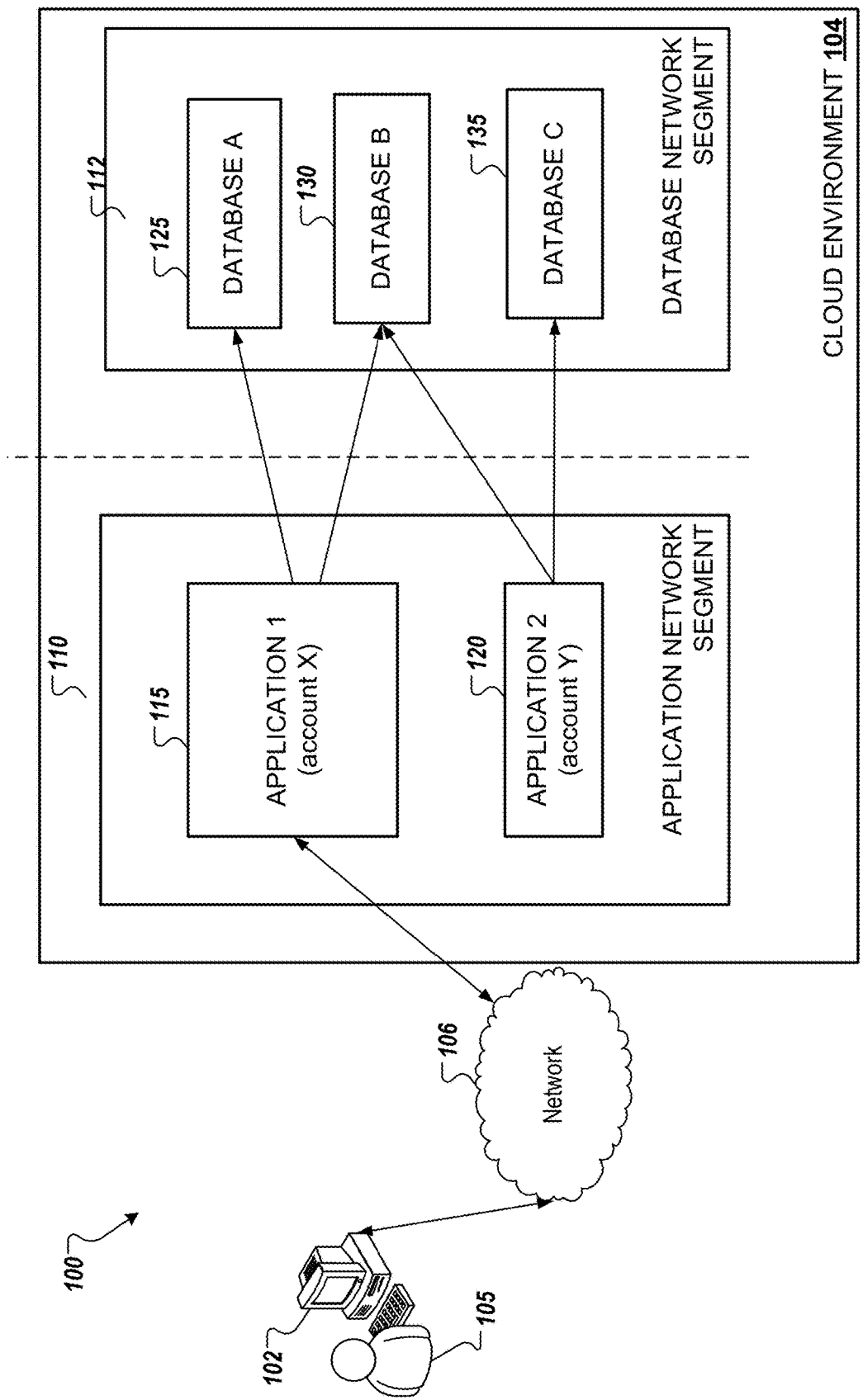
FIG. 1 illustrates an example computer system architecture that can be used to execute implementations of the present disclosure.

The present disclosure describes various tools and techniques for dynamic configuration of access restrictions on an application in relation to databases running in a cloud environment. In some instances, communication and data transfer between applications and databases running in the cloud environment can be managed to provide data isolation based on an access restriction criteria.

When software applications run in a cloud environment, the applications may consume database services from databases also running in the cloud environment. Data can be stored in multiple databases in the cloud environment and the databases may be accessible from multiple applications also running in the cloud environment. The software applications may be associated with different accounts and different scenarios. In some instances, accounts may be defined in relation to customers running software and hardware components in the cloud environment. For example, accounts can be associated with customers, users, and projects. Particular accounts of the multiple accounts may be associated with a set of applications (or services) and databases running in the cloud environment. One application and/or database may be associated with multiple accounts.

One or more of the applications running in the cloud may be related to a subset of the databases. Software applications in the cloud may run on one or more corresponding virtual machines (VMs) to provide services to end-users. When a software application runs in the cloud environment (that may also be referred to as a cloud application), that cloud application may access databases. The applications and databases in the cloud environment may be configured to run within one network. While the applications may request access to the databases in the cloud environment, for example, when running application processes, the access may be required to be restricted.

One example of security considerations when managing access from applications to databases in the cloud environment may be to ensure data protection and data isolation. Thus, access restrictions to data stored at the different databases may be defined to limit access from an application to one or more databases from all of those databases running in the cloud environment that are relevant for the application. In such cases, the application is allowed to access the one or more databases, and is restricted from accessing other databases running in the cloud environment other than those specifically allowed. A database that can be validly accessible from a given application, may be, for example, a database that is associated with a customer or an account corresponding to the one of the applications. The access restrictions may be provided based on different restriction criteria and/or different parameters.

In some instances, an application may be associated with a set of designated databases when they are associated with the same application provider, same customer or customer account, with a particular use case or scenario that identifies the databases as relevant for the application, or in another manner of associating the application with a database from the databases running in the cloud environment.

In some instances, by configuring an access policy for the application, access to data may be limited. One application may be restricted to access a database that is associated with a different customer/account from the account associated with the application. Further, the application can also be validly provided with access to a database associated with the same customer/account as the customer/account associated with the application. In some instances, to provide restricted access and to manage isolation of one application to one or more databases that are designated to that application, a virtual machine (VM) manager may be deployed in the cloud to manage configurations of VMs on which applications are running.

FIG. 1 depicts an example architecture 100 in accordance with implementations of the present disclosure. In the depicted example, the example architecture 100 includes a client device 102, a network 106, and a cloud environment 104. The cloud environment 104 includes one or more server devices and databases (e.g., processors, memory). In the depicted example, a user 105 interacts with the client device 102.

In some examples, the client device 102 can communicate with the cloud environment 104 over the network 106. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 104 includes at least one server and at least one data store. In the example of FIG. 1, the cloud environment 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the cloud environment 104 can host applications and databases running on host infrastructure. In some instances, the cloud environment 104 includes an application network segment 110 and a database network segment 112. The application network segment 110 includes multiple applications, such as "Application 1" 115 and "Application 2" 120 that can run on VMs hosted on cloud infrastructure. In some instances, the applications may run correspondingly on one or multiple VMs. In some instances, one application can run as multiple application instances on multiple corresponding VMs, where each application instance is running on a corresponding VM.

In the cloud environment 104, the applications are running at the application network segment 110 to provide end-user services, for example, services associated with requests sent through the network 106 from user 105 over device 102. The applications and the databases that are running in the cloud environment 104 may be designed, developed, executed, and maintained in relation to different customers and based on configured accounts that define process execution in relation to the applications and the database.

In some instances, the cloud environment 104 may host applications and databases that are related to different customers and/or accounts and may be configured to interact in a particular way. While the applications and databases run in one cloud environment 104 and within one network having two segments, one application may be restricted to access one of the databases, as in some instances, the database may be not relevant for the application, for example, associated with a different customer account. In some instances, data isolations between accounts defined in the cloud environment 104 may be required to be provided.

When the applications are executed, they may perform operations that require access to database storages, such as one or more of the databases at the database network segment 112. In some instances, the database network storage 112 includes multiple databases, including "Database A" 125, "Database B" 130, "Database C" 135, and/or more. These databases may be associated with corresponding applications, and one database may be associated with more than one application. For example, when two applications are associated with two customer accounts, it may be configured that each application may validly request services from different databases that are also identified as related to the two customer accounts. In some other examples, two application may be associated with two customer accounts each, and there may be one database that may be associated with both of the two customer accounts. For example, "Database B" 130 may be associated with both "Application 1" 115 and "Application 2" 120 that are related to two accounts—account X and account Y, correspondingly. In yet another example, some databases may be associated with a single application and respectively with a single account. For example, "Database A" 125 may be associated with "Application 1" 115 and account X, and may not be associated with "Application 2" 120 and account Y. Thus, in such examples, as the "Database A" 125 is not associated with "Application 2" 120, requests for accessing data from "Application 2" 120 to "Database A" 125 should not be served and access is to be configured as restricted. By implementing access configurations at the application level, security during data transactions between applications and databases in the cloud environment 104 may be improved.

Figure 2:
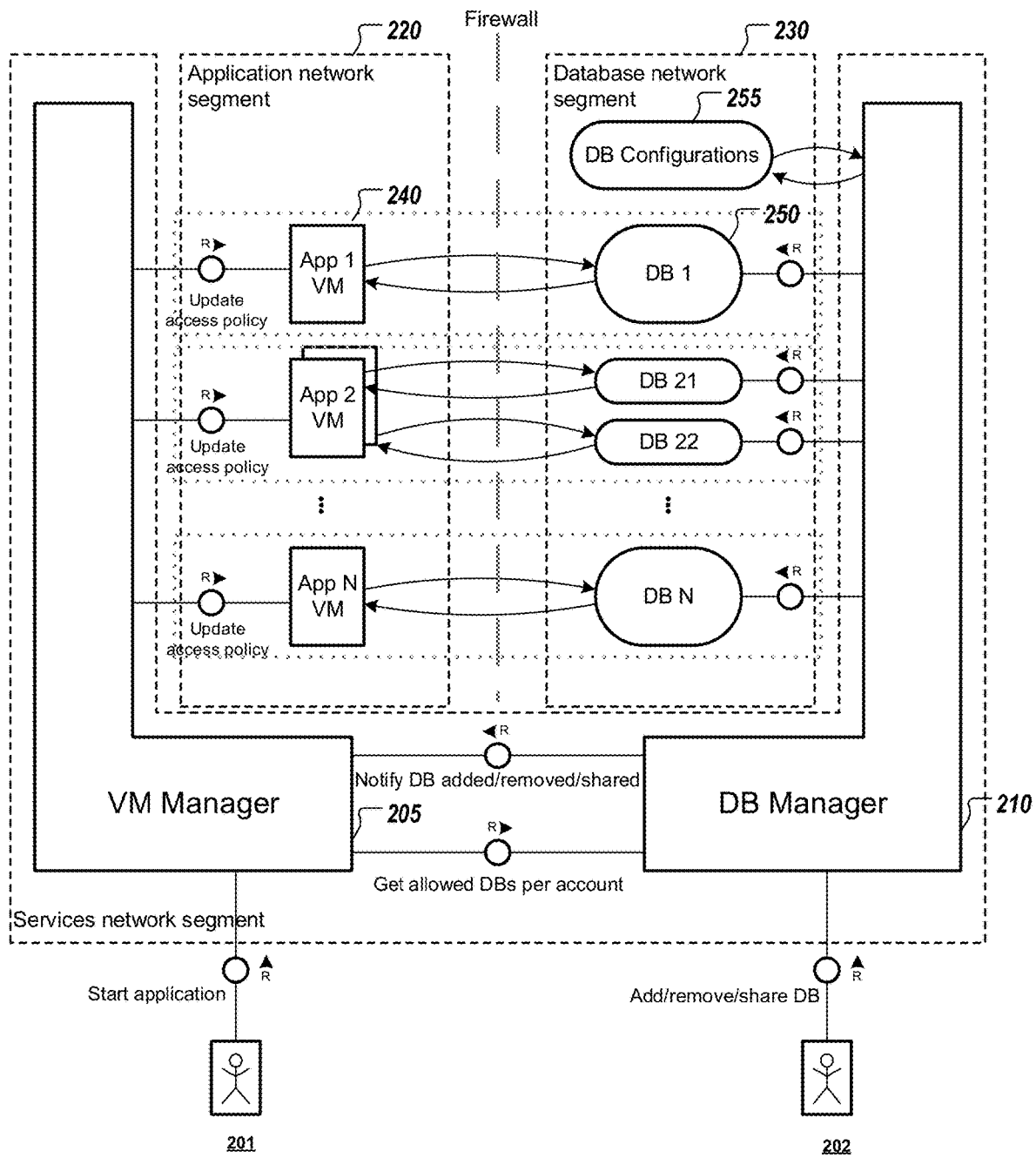
FIG. 2 is a block diagram for an example system for managing isolation between applications and databases in a cloud environment in accordance with implementations of the present disclosure.

FIG. 2 is a block diagram for an example system 200 for managing isolation between applications and databases in a cloud environment in accordance with implementations of the present disclosure. In some instances, the cloud environment may be such as the cloud environment 104 of FIG. 1. The cloud environment may host applications and databases that are associated with different customers and/or accounts and may be configured to interact in a particular way.

In some instances, databases are running at a database network segment 230 and software applications are running at an application network segment 220. The software applications running at the application network segment 220 may be cloud applications that execute over VMs running on a cloud platform infrastructure. In some instances, one software application may be running on a single VM or on a plurality of VMs. The communications between the two segments, i.e., 220 and 230, can be filtered out based on a network firewall.

In some instances, some applications may be associated with corresponding customers and/or customer accounts, and/or may be associated with a subset of the databases running at the database network segment. While the applications and the databases run in the cloud environment and within the two segments, one application may be restricted from accessing one of the databases, if the application and the database are each associated with different customer accounts. For example, if the application is associated with account X and the database is associated with account Y, then the application may be restricted from accessing data stored in a database associated with another different account. In some instances, data isolations between accounts defined in the cloud environment may be required to be provided.

For example, "Application 1" 240 may be running at the application network segment 220 and may be consuming database services from "Database 1" 250. In some instances, a new database may be provisioned at the database network segment 230 as associated with the "Application 1" 240. In such cases, the new database may be associated with other applications running at the application network segment 220.

In some instances, a VM manager 205 and a database (DB) manager 210 may be instantiated and deployed in the cloud environment for configuring security policies for the running applications and databases. By configuring security policies, data security protection of data stored at the databases at the database network segment 230 can be improved.

In some instances, the VM manager 205 and the DB manager 210 may be running as part of a service network segment. The VM Manager 205 and the DB manager 210 may receive direct requests from end-users, such as users 201 and 202, and in relation to different requests associated with running new applications and/or databases at the cloud environment. Based on received requests for running new applications and/or database, security access policies can be configured for applications running in the application network segment 220. Such access policies can be configured based on evaluations and instructions performed by the VM manager 205 and the DB manager 210.

In some instances, the VM manager 205 may receive direct requests associated with running new applications that are to be started in the cloud environment. The VM manager 205 may determines configurations for those new applications and configure/apply security policy restrictions according to databases that are allowed for the application. The VM manager 205 may receive information about the allowed databases from the DB manager 210. In some instances, the VM manager 205 receives requests from the DB manager 210. In some instances, the requests received from the DB manager 210 at the VM manager 205 may be notifications associated with additions or removals of databases. In particular, the DB manager 210 may receive requests for addition or removal of a database at the cloud environment, and based on such requests may notify the VM manager 205 for changes in the database, for example, addition or removal of a database. Further, it can be appreciated that other changes to databases may also be requested to the DB manager 210 and corresponding notifications can be sent to the VM manager 205. For example, a request may be to change access restrictions for a given database that is already running in the cloud environment, e.g., for sharing or limiting the sharing of the database with another customer or account. Such requests for addition or removal may be received at the DB manager 210 from the user 202. In response to receiving a request to change the databases in the database segment 230 of the cloud environment at the DB Manager 210, the DB manager 210 may notify the VM manager 205. The changes in the databases may include changing configurations of a running database, adding a new database to the databases, and removing a database from those that are running, for example. By notifying the VM Manager 205 about such changes, the VM manager 205 may determine whether such changes affect the configuration of any of the running applications at the application network segment 220. When the VM manager 205 determines that the changes in the database network segment 230 affect already running application(s), the VM manager 205 may send instructions to corresponding VM(s) associated with affected application(s). Based on the instructions, the VM manager 205 may configure the determined application(s) according to new or updated configuration rules for accessing databases from the database network segment 230.

In some instances, the VM Manager 205 may be responsible for managing the lifecycle of the application VMs, including operations such as starting and stopping of VMs. The VM manager 205 may provide additional configurations to the application VMs at the application network segment 220. One such configuration may be related to database access, for example, identifying which databases can be accessed by the VM. After an application VM is configured with a list of allowed databases to access, that configuration can also be changed in response to receipt of a notification from the DB manager 210. In some instances, such a notification may be associated with a change in the databases persisted at the database network segment 230. For example, the change in the databases may be adding or removing a database in relation to an account of an application running on an application VM at the application network segment 220.

In some instances, application VMs can store configuration data at data tables. In some instances, the database tables can be implemented as iptables including rule configurations. The configuration of the application VMs can be implemented by using ipsets that can be added in rule configurations defined at the iptables at the application VMs. In some instances, using ipsets can simply the configuration of the iptables in cases where application VMs have to be configured for accessing multiple network addresses for corresponding database. The VM Manager 205 may provide a lightweight software component (or an agent) to be installed on the application VM through which the data tables, including configuration rules, can be manipulated remotely from the VM manager 205. In some instances, the VM manager 205 can receive notifications for changes in the databases, for example, addition of a new database or removal of an existing database. The VM manager 205 can identify the added or removed database with their network addresses or network at the data table. In response to a user triggering a start of an application on an application VM, the VM Manager 205 can retrieve a set of DBs to which the requested application has access, and can apply a respective configuration as rules in the VM's configuration data table. By applying the configuration, an application process running on the application VM can only access the allowed databases.

In some instances, a user (and, respectively, a customer associated with the user) can add a new database in relation to an account, such as the customer account or the user account. The DB manager 210 may store configurations for databases running at the database network segment at a DB Configurations 255. In some instances, DB configurations 255 can be instantiated as a component part of the database network segment. The DB Manager 210 can update the DB configurations 255 and can notify the VM Manager 205 that a new DB is available for the customer's account. When a notification for adding the database is received at the VM manager 205, the VM Manager 205 may update the access policy on running applications that are associated with the account to ensure that the new database can be accessed by applications associated with that account and restricted from accessing by applications associated with other accounts. It can be appreciated that equivalent actions can be taken when a database is removed or shared with another customer. In some instances, the customer may have large number of running application VMs which can each be updated via a controlled parallelism to speed up the update.

In some instances, the DB Manager 210 may be responsible for the lifecycle of the databases and the database configurations. The DB Manager 210 can assign and configure a database to a particular customer account. The DB Manager 210 can also be used by customers or users to share a database that is existing at the database network segment 230 with another customer or account, and indirectly with other applications running on VMs at the application network segment 220. The DB configurations 255 may be a storage component including data about database IP addresses. The DB configurations 255 may include information about mappings between accounts, DBs, and the shared permissions. The configurations can be maintained by the DB Manager 210, while the DB manager 210 manages the lifecycle of the databases or receives instructions from customers or users for configurations.

Figure 3:
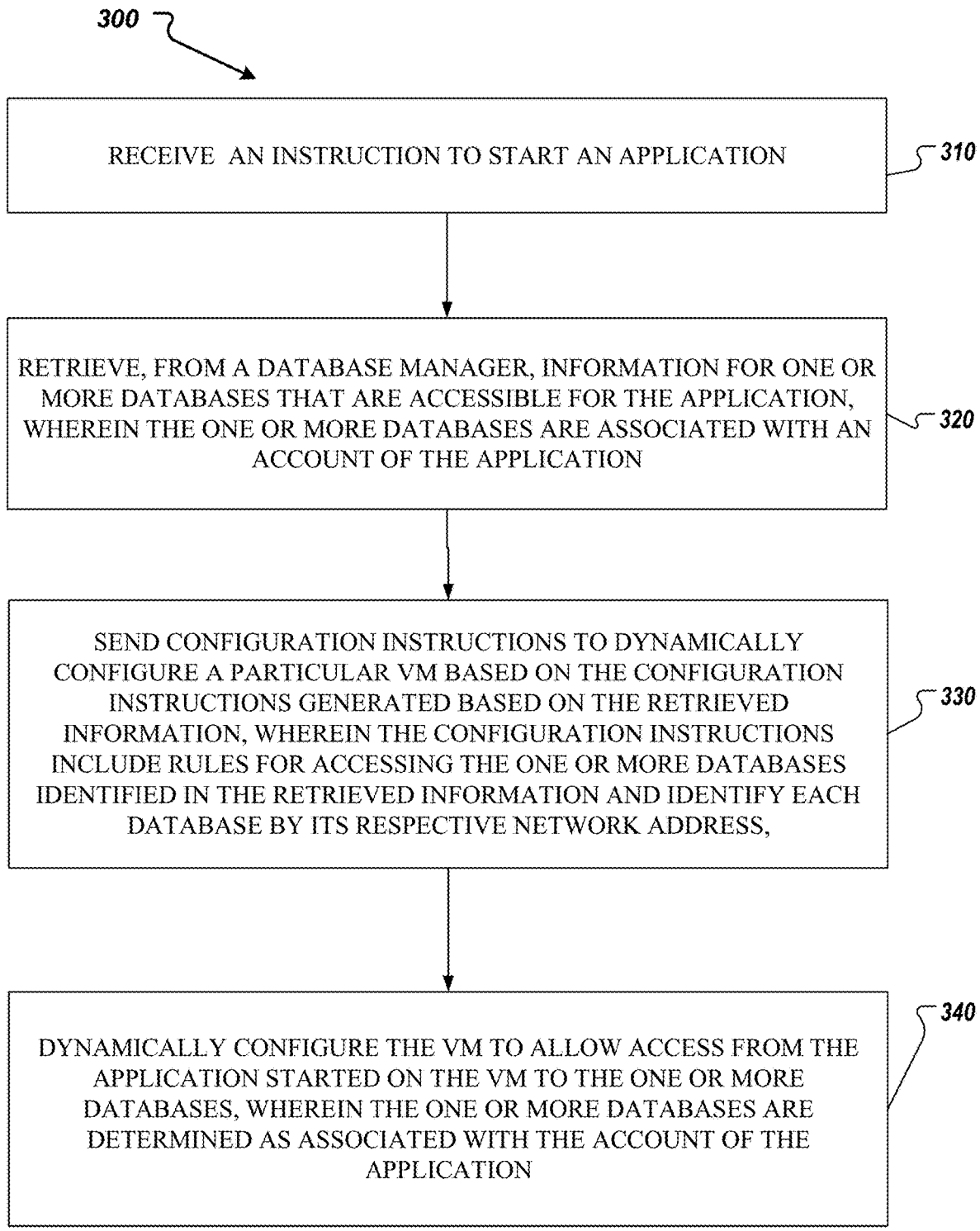
FIG. 3 is a flowchart for an example method for managing isolation between applications and databases in a cloud environment in accordance with implementations of the present disclosure.

FIG. 3 is a flowchart for an example method 300 for managing isolation between applications and databases in a cloud environment in accordance with implementations of the present disclosure. The example method 300 may be executed at a VM manager, such as the VM manager 205 of FIG. 2.

In some instances, the applications and the databases may run in a cloud environment. The applications may execute processes and access the databases to provide services to end-users. The applications and the databases may be related to multiple different accounts and may have different security configurations. Thus, it may be possible that not all applications are authorized to access each of the databases. The example method 300 may be executed at a VM manager that may be configured to implement restriction for accessing data at different databases from each of the applications in the cloud environments.

At 310, an instruction to run an application is received by a VM manager. The VM manager may be provided as part of an application network segment of the cloud environments, such as the application network segment 110 of the cloud environment 104 of FIG. 1.

In some instances, the VM manager manages lifecycles of a plurality of VMs running in an application network segment of a network. In some instances, the application network segment is defined as a network segment of a network corresponding to the cloud environment. Each VM from the plurality of VMs can host at least one application that consumes resources from a database network segment of the network.

At 320, information identifying one or more databases accessible to the application is retrieved from a database manager by the VM manager. The database manager may be part of a database network segment of the cloud environment, such as the database network segment 120 of the cloud environment 104 of FIG. 1. The one or more databases may be associated with at least one account of the application.

In some instances, the one or more databases may run in a database network segment of the cloud environment. The application network segment and the database network segment may be isolated, requiring them to communicate through a firewall.

In some instances, applications running in the cloud environment may be defined as associated with at least one account. The account may be associated with defined processes, configurations, and privileges for performing actions at the cloud environment. In some cases, one application may be associated with multiple accounts, where in some cases, different instances of the application may be running in relation to serving requests associated with the different accounts.

In some instances, the database manager can identify the one or more databases as being associated with the account of the application. The one or more databases may be identified from a plurality of databases running in a database network segment of the cloud environment. The plurality of databases may be associated with a plurality of accounts including the account of the application. In some instances, one database may be associated with multiple accounts, and one application may be associated with multiple accounts. Thus, identification of a database that is associated with a particular application may be based on at least one of the accounts of the application.

In some instances, to retrieve the information identifying the one or more databases as accessible, the VM manager may send a request to the database manager. The request can include an identifier of an account associated with the application that is requested to run. The account associated with the application may be provided as part of the received instructions (at 310) to run the application. In response to receiving the information identifying the one or more databases, the configuration instructions can be generated at the VM manager. The configuration instructions can be generated by creating rules that include network addresses of the one or more databases. The rules may also include routing information for accessing at least one network where the one or more databases reside.

At 330, configuration instructions to dynamically configure a particular VM at which the application is to run is sent by the VM manager. In response to receiving the instructions, the particular VM can be configured based on rules included in the configuration instructions. The VM manager may create a new VM or use an already existing one when a request to start an application is received. The VM manager may initiate which VM to be used for running the application independently from the instructions to start the application. The configuration instructions can be generated based on the retrieved information from the database manager about the one or more databases that are accessible to the application. The configuration instructions may include rules for accessing the one or more databases identified in the retrieved information where, in some instances, the rules can identify each database by its respective network address. Based on executing the rules at the particular VM, the particular VM can be allowed to access the one or more databases. Thus, the access of the application can be restricted to one or more identified databases after the configuration execution.

In response to configuring the particular VM according to the configuration instructions (sent at 330), the application can be restricted from accessing other databases at the cloud environment, where the other databases are different from the identified one or more databases for which the application is approved for accessing. For example, the other databases may also reside in the same network as the particular VM and/or the allowed databases for accessing.

At 340, the particular VM is dynamically configured to allow access from the application running on the particular VM to the one or more databases. In response to configuring the particular VM to allow access to the identified one or more databases based on the sent instructions from the VM manager, a notification that the application is running on the particular VM may be provided by the VM manager and, optionally, to a user associated with the received instruction to run the application at 310.

In some instances, after the VM manager sends the configuration instructions, the VM manager applies access security policies at the particular VM where the application is running. The access security polices can be applied by adding one or more records in a configuration table encoding the rules part of the configuration instructions for configuring the access to the one or more databases.

In some instances, a notification can be received from the database manager at the VM manager that indicates that a new database is added to an account associated with the application that is running in the cloud environment (as requested at 310). In response to receiving the notification at the VM manager, instructions to update the rules configured for the application at the particular VM can be sent. The instructions can include a new rule specific to the new database, where the new rule is to be added to existing configured rules for accessing databases from the application. In some instances, in response to receiving the notification, the VM manager can identify VMs associated with the account of the application. A change in the configuration of the identified VMs for accessing the VMs can be dynamically triggered. In some instances, the dynamic triggering of the change may include adding rules associated with the identified VMs. The added rules can identify a network address where the new database resides. The added rules may identify the network address of the new database as an allowed network address for accessing by the identified VMs.

Figure 4:
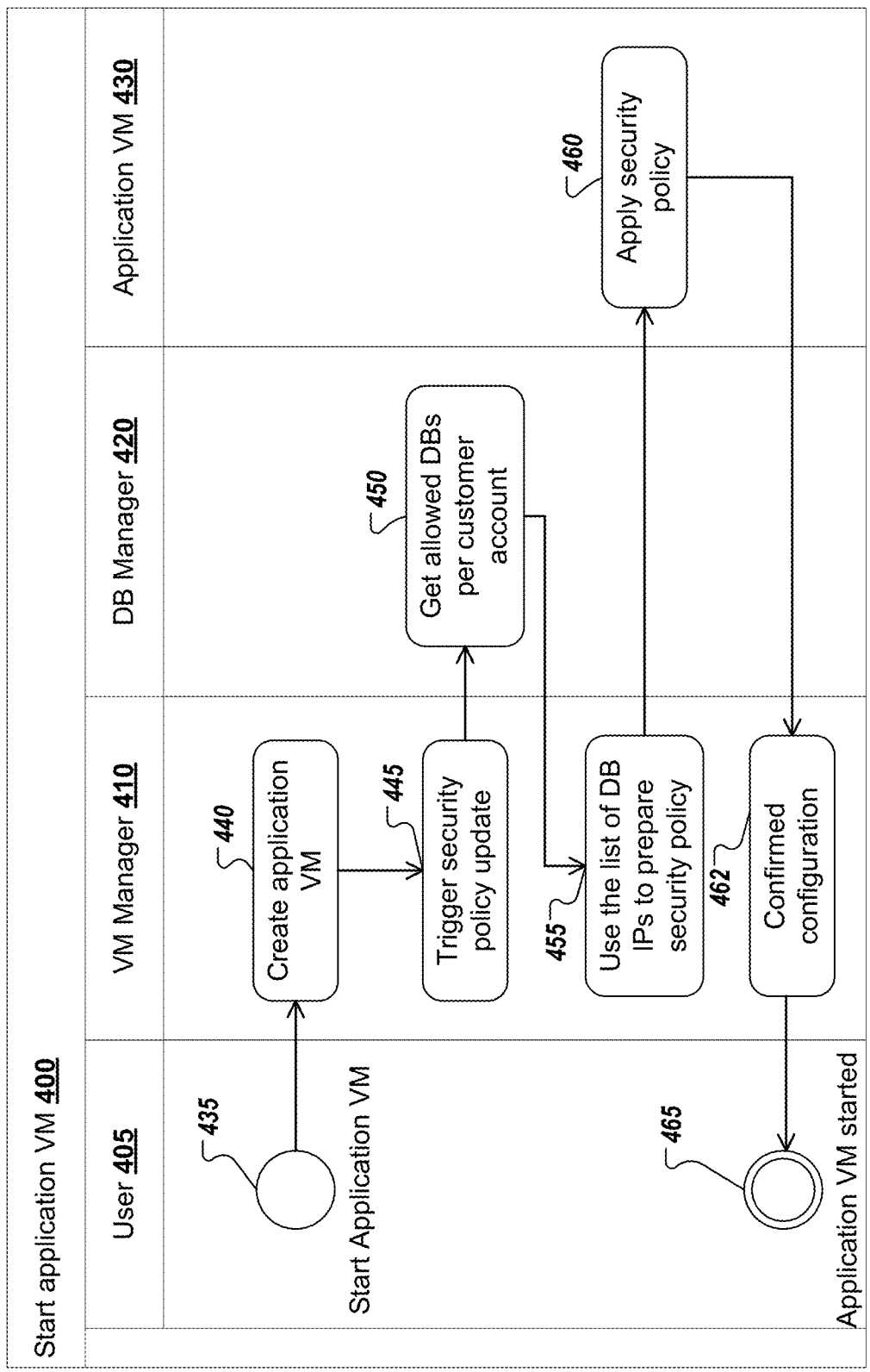
FIG. 4 is a block diagram for an example method for managing access restrictions to databases for a software application that is to be started in accordance with implementations of the present disclosure.

FIG. 4 is a block diagram for an example method 400 for managing access restrictions to databases for a software application that is to be started in accordance with implementations of the present disclosure. The example method 400 may be executed in relation to a user 405, a VM manager 410, a database manager 420, and an application VM 430. The example method 400 may be executed in a cloud environment, such as the cloud environment discussed in relation to FIG. 1, FIG. 2, and/or FIG. 3.

At 435, the user 405 sends a request to the VM Manager 410 to start a new application VM and run an application. For example, the request 435 may be such as the request 310 at FIG. 3. The request 435 may be associated with running a particular application associated with a provided account on a particular new VM running in the cloud environment, for example, as part of an application network segment. In some instances, the requested application may execute processes that invoke data from a database running at a database network segment of the cloud environment. At 440, the VM Manager 410 creates, or initiates the creation of, the application VM. At 445, the VM manager 410 triggers a security policy update to be executed for the application being requested to run on the new application VM. In some instances, the VM Manager 410 calls the DB Manager 420 to get a list of allowed-to-access database. The databases from the list may be identified by their network address, such as an IP address. The VM manager 410 sends a request to get the allowed DBs (at 450) by providing an account, such as a customer account number, associated with the application being requested. At 455, the VM Manager 410 prepares a security policy configuration based on the retrieved list of databases and their network addresses. The prepared configuration may also include a classless interdomain routing (CIDRs) information of the networks of the databases. The VM manager 410 can apply the access security policy by adding appropriate data sets including the network address information into data table including configuration rules on the application VM. For example, the VM manager 410 may add two data sets: i) a first data set including the IPs of the allowed to access databases; and ii) a second data set including allowed networks (CIDR) of the databases.

In some instances, based on the applied security policies, when a first account (for example, associated with an entity, such as a customer) is associated with an application, only those databases associated with the first account may be accessed through the application, while databases associated only with a second account will not be accessible. At 462, the VM manager 410 receives a notification from the application VM 430 that the security configurations are completed. At 465, the VM Manager 410 returns a response to the user 405 that the application VM 430 has started.

Figure 5:
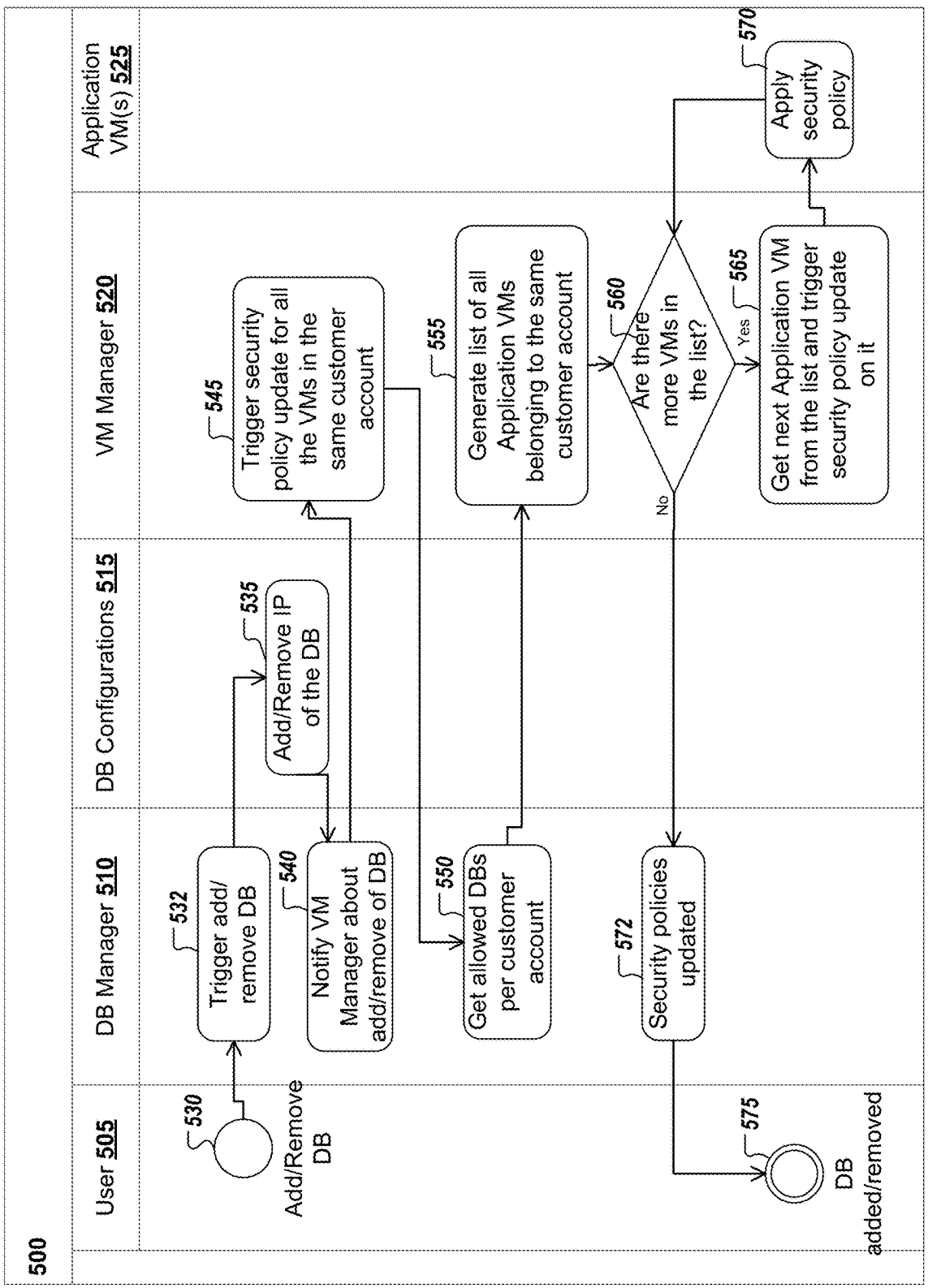
FIG. 5 is a block diagram for an example method for configuring access restrictions for a new configured database at a software application running in a cloud environment in accordance with implementations of the present disclosure.

FIG. 5 is a block diagram for an example method 500 for configuring access restrictions for a new configured database at a software application running in a cloud environment in accordance with implementations of the present disclosure. The example method 500 may be executed in relation to a user 505, a database manager 510, a database configurations component 515, a VM manager 520, and an application VM(s) 525. The example method 500 may be executed in a cloud environment, such as the cloud environment discussed in relation to FIG. 1, FIG. 2, FIG. 3 and/or FIG. 4.

In some instances, at 530, the user 505 sends a request to the DB Manager 510 to add/remove a database. At 532, the DB Manager 510 triggers the add/remove process for a database. The DB configurations component 515 adds/removes a database, at 535, as identified in the customer account.

The DB Manager 510 can add/remove the access network address (e.g., IP address) of the database in the DB Configurations component. At 540, the DB manager 510 notifies the VM Manager 520 about the addition or removal of the database. At 545, the VM Manager 520 triggers the security policy update for all VMs in the same customer account.

The VM Manager 520 calls the DB Manager 510 to get (at 550) a list of databases (database access IPs) that are allowed to be accessed by the customer account.

At 555, the VM Manager 520 generates a list of all application VMs associated with the same customer account.

The VM Manager 520 then iterates over the list of the VMs (iterating over VMs in the list at decision block 560), and triggers changes of the security policy for each VM in the list (at 570). Over each iteration, the VM manager 520 gets a next application VM from the list, at 565, to trigger a next security policy update operation to be executed at a corresponding application VM. The VM Manager 520 applies the access security policy by adding appropriate databases in the tables including rules configurations on the application VM. In some instances, the VM manager 520 can initiate an addition of two datasets: i) a first dataset including the IPs of the allowed to access databases; and ii) a second dataset including the allowed networks (CIDR) of the databases. In some instances, based on the actions performed at 570 over iterations performed for VMs and already started application VMs (associated with the same account), the application VMs are updated with security access policy allowing them to access the newly added DB (or disabling the access to the removed DB). The VM Manager 520 may return a response to the DB manager 510 that the performed new configuration for addition or removal of a database is applied on the application VMs in the account to update the security policies (at 572). The DB manager 510 may then send, at 575, a response to the user that a database is added or removed. In some instances, the VM manager 520 may communicate a result of the security policy configuration (e.g., successful policy configuration) to the DB manager 510. The DB manager 510 can provide a notification to the user 505 directly. In other cases the VM manager 520 can send the notification to the user 505 without communicating with the DB manager. For example, the VM manager 520 may be configured to communicate directly the result of the security policy configuration with the user 505 when the result defines a successful configuration completion.

In some instances, the VM manager 520 may store received and generated configurations including information for application VMs which had been instructed but failed for one or more particular application VMs. The VM manager 520 may send instructions as an update for those stored configurations later when the VM manager 520 detects that the one or more particular application VMs are operational again.

Figure 6:
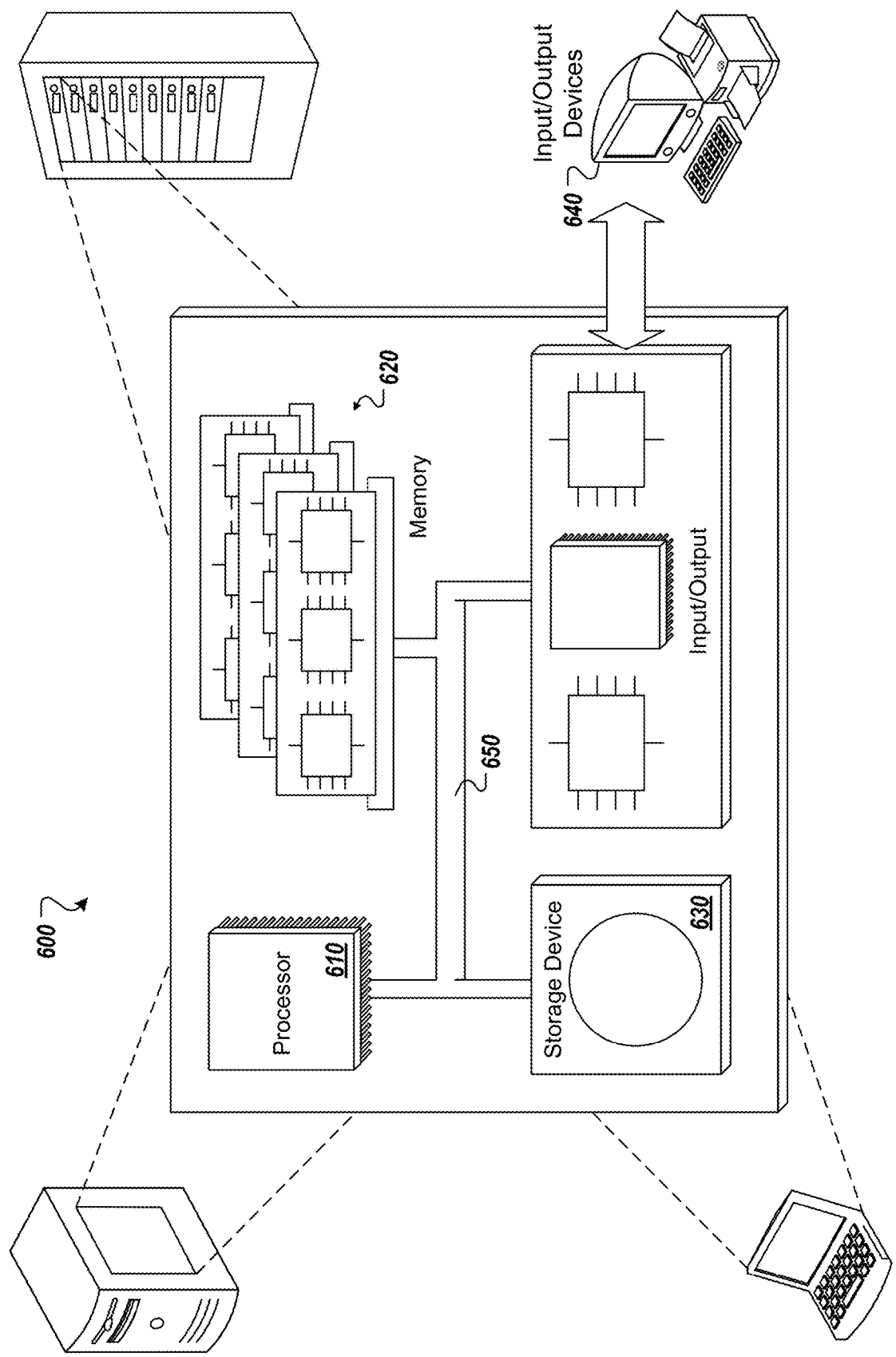
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method for managing data isolation in a cloud environment, the method comprising: receiving, by a virtual machine (VM) manager, an instruction to run an application; retrieving, by the VM manager and from a database manager, information identifying one or more databases accessible to the application, wherein the one or more databases are associated with at least one account of the application; and sending, by the VM manager, configuration instructions to dynamically configure a particular VM at which the application is to run, wherein the particular VM is configured based on the configuration instructions, wherein the configuration instructions are generated based on the retrieved information and include rules for accessing the one or more databases identified in the retrieved information, wherein the rules identify each database by its respective network address, and wherein the rules cause the particular VM to allow the application to access the one or more databases.

Example 2. The computer-implemented method of Example 1, further comprising: dynamically configuring, by the VM manager, the particular VM to allow the application to run on the particular VM to access the one or more databases.

Example 3: The computer-implemented method of Example 1 or 2, wherein the database manager identifies the one or more databases as being associated with the account of the application, wherein the one or more databases are identified from a plurality of databases running in a database network segment, the plurality of databases associated with a plurality of accounts including the account of the application.

Example 4: The computer-implemented method of any one of Examples 1 to 3, further comprising: providing, by the VM manager and to a user associated with the received instruction to run the application, a notification that the application is running on the particular VM.

Example 5: The computer-implemented method of any one of Examples 1 to 4, wherein the VM manager manages lifecycles of a plurality of VMs running in an application network segment of a network, wherein each VM from the plurality of VMs hosts at least one application that consumes resources from a database network segment of the network.

Example 6: The computer-implemented method of any one of Examples 1 to 5, wherein retrieving the information identifying the one or more databases accessible to the application comprises: requesting, from the database manager, the information by providing an identifier of the account associated with the application, wherein the received instruction to run the application includes information identifying the account associated with the application; and in response to receiving the information identifying the one or more databases, generating the configuration instructions by creating the rules to include network addresses of the one or more databases and routing information for accessing at least one network where the one or more databases reside.

Example 7: The computer-implemented method of any one of Examples 1 to 6, further comprising: applying, by the VM manager and at the particular VM where the application is run, access security policies by adding one or more records in a configuration table encoding the rules for configuring access to the one or more databases.

Example 8: The computer-implemented method of any one of Examples 1 to 7, wherein the application runs in an application network segment including a plurality of applications, wherein the one or more databases run in a database network segment, and wherein the application network segment and the database network segment are isolated to communicate through a firewall.

Example 9: The computer-implemented method of any one of Examples 1 to 8, wherein a database is running at a database network segment, and wherein the database is associated with a set of accounts and is accessible by a set of applications from a plurality of applications running in an application network segment, wherein the application network segment is communicatively coupled to the database network segment.

Example 10: The computer-implemented method of any one of Examples 1 to 9, further comprising: receiving, at the VM manager and from a database manager, a first notification indicating that a new database is added in relation to the account of the application; and in response to receiving the first notification, sending, by the VM manager, instructions to update the rules configured for the application at the particular VM, wherein the instructions include a new rule for the new database to be added to existing configured rules for accessing databases from the application.

Example 11: The computer-implemented method of any one of Examples 1 to 10, further comprising: receiving, at the VM manager and from a database manager, a second notification indicating that a database from the one or more databases associated with the account of the application is removed; and in response to receiving the second notification, sending, by the VM manager, instructions to update the rules configured for the application for accessing databases from the application at the particular VM, wherein the updated rules disable access to the removed database.

Example 12: The computer-implemented method of any one of Examples 1 to 11, further comprising: receiving, at the VM manager and from a database manager, a third notification indicating that a database associated with a different account from the account of the application is shared with the account of the application; and in response to receiving the third notification, sending, by the VM manager, instructions to update the rules configured for the application at the particular VM, wherein the instructions include a new rule for the shared database to be added to existing configured rules for accessing databases from the application.

Example 13: The computer-implemented method of any one of Examples 1 to 12, further comprising: in response to receiving the notification, identifying VMs associated with the account of the application; and dynamically triggering a change in configuration of the identified VMs for accessing the VMs.

Example 14: The computer-implemented method of any one of Examples 1 to 13, wherein dynamically triggering the change in the configuration comprises: adding rules associated with the identified VMs, wherein the rules identify a network address of the new database that is added in relation to the account of the application; and adding rules defining a network address where the new database resides as an allowed network address for accessing by the VM.

Similar operations and processes as describes in Examples 1 to 14 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 14 may also be contemplated.

What is claimed is:

1. A method for managing data isolation in a cloud environment, the method comprising:
receiving, by a virtual machine (VM) manager, an instruction to run a first application;
retrieving, by the VM manager and from a database manager, information identifying one or more databases accessible to the first application, wherein the one or more databases are associated with an account of the first application, wherein the first application runs in an application network segment including a plurality of applications, and wherein the one or more databases run in a database network segment, wherein the application network segment and the database network segment are part of the cloud environment;
sending, by the VM manager, configuration instructions to dynamically configure a particular VM at which the first application is to run, wherein the particular VM is configured based on the configuration instructions, wherein the configuration instructions are generated based on the retrieved information and include rules for accessing the one or more databases identified in the retrieved information, wherein the rules identify each database by its respective network address, and wherein the rules cause the particular VM to allow the first application to access the one or more databases;
receiving, by the VM manager and from a database manager, a first notification indicating that a new database has been added in the database network segment, wherein the new database is configured for accessing based on requests received from applications associated with the account of the first application;
in response to receiving the first notification, sending, by the VM manager, instructions to update rules associated with one or more other applications, the one or more other applications being deployed at the application network segment and being associated with the account of the first application; and
updating the rules configured at each of the one or more other applications and the first application, and wherein updating the rules comprise configuring a new rule for the new database to be added to the updated rules as configured for accessing databases from each of the one or more other applications and the first application.

2. The method of claim 1, wherein the database manager identifies the one or more databases as being associated with the account of the application, wherein the one or more databases are identified from a plurality of databases running in a database network segment, the plurality of databases associated with a plurality of accounts including the account of the application.

3. The method of claim 1, further comprising:
providing, by the VM manager and to a user associated with the received instruction to run the application, a notification that the application is running on the particular VM.

4. The method of claim 1, wherein the VM manager manages lifecycles of a plurality of VMs running in an application network segment of a network, wherein each VM from the plurality of VMs hosts at least one application that consumes resources from a database network segment of the network.

5. The method of claim 1, wherein retrieving the information identifying the one or more databases accessible to the application comprises:
requesting, from the database manager, the information by providing an identifier of the account associated with the application, wherein the received instruction to run the application includes information identifying the account associated with the application; and
in response to receiving the information identifying the one or more databases, generating the configuration instructions by creating the rules to include network addresses of the one or more databases and routing information for accessing at least one network where the one or more databases reside.

6. The method of claim 1, further comprising:
applying, by the VM manager and at the particular VM where the application is run, access security policies by adding one or more records in a configuration table encoding the rules for configuring access to the one or more databases.

7. The method of claim 1, wherein the application runs in an application network segment including a plurality of applications, wherein the one or more databases run in a database network segment, and wherein the application network segment and the database network segment are isolated to communicate through a firewall.

8. The method of claim 1, wherein a database is running at a database network segment, and wherein the database is associated with a set of accounts and is accessible by a set of applications from a plurality of applications running in an application network segment, wherein the application network segment is communicatively coupled to the database network segment.

9. The method of claim 1, further comprising:
receiving, at the VM manager and from a database manager, a first notification indicating that a second new database is added in relation to the account of the application; and
in response to receiving the first notification, sending, by the VM manager, instructions to update the rules configured for the application at the particular VM, wherein the instructions include a new rule for the second new database to be added to existing configured rules for accessing databases from the application.

10. The method of claim 1, further comprising:
receiving, at the VM manager and from a database manager, a second notification indicating that a database from the one or more databases associated with the account of the application is removed; and
in response to receiving the second notification, sending, by the VM manager, instructions to update the rules configured for the application for accessing databases from the application at the particular VM, wherein the updated rules disable access to the removed database.

11. The method of claim 1, further comprising:
receiving, at the VM manager and from a database manager, a third notification indicating that a database associated with a different account from the account of the application is shared with the account of the application; and
in response to receiving the third notification, sending, by the VM manager, instructions to update the rules configured for the application at the particular VM, wherein the instructions include a new rule for the shared database to be added to existing configured rules for accessing databases from the application.

12. The method of claim 9, further comprising:
in response to receiving the notification, identifying VMs associated with the account of the application; and
dynamically triggering a change in configuration of the identified VMs for accessing the VMs.

13. The method of claim 12, wherein dynamically triggering the change in the configuration comprises:
adding rules associated with the identified VMs, wherein the rules identify a network address of the second new database that is added in relation to the account of the application; and
adding rules defining a network address where the second new database resides as an allowed network address for accessing by the VM.

14. A non-transitory, computer-readable medium coupled to one or more processors and having instructions stored thereon which, when executed by the one or more processors, cause the one or more processors to perform operations, the operations comprising:
receiving, by a virtual machine (VM) manager, an instruction to run a first application;
retrieving, by the VM manager and from a database manager, information identifying one or more databases accessible to the first application, wherein the one or more databases are associated with an account of the first application, wherein the first application runs in an application network segment including a plurality of applications, and wherein the one or more databases run in a database network segment, wherein the application network segment and the database network segment are part of a cloud environment;
sending, by the VM manager, configuration instructions to dynamically configure a particular VM at which the first application is to run, wherein the particular VM is configured based on the configuration instructions, wherein the configuration instructions are generated based on the retrieved information and include rules for accessing the one or more databases identified in the retrieved information, wherein the rules identify each database by its respective network address, and wherein the rules cause the particular VM to allow the first application to access the one or more databases;
receiving, by the VM manager and from a database manager, a first notification indicating that a new database has been added in the database network segment, wherein the new database is configured for accessing based on requests received from applications associated with the account of the first application;
in response to receiving the first notification, sending, by the VM manager, instructions to update rules associated with one or more other applications, the one or more other applications being deployed at the application network segment and being associated with the account of the first application; and
updating the rules configured at each of the one or more other applications and the first application, and wherein updating the rules comprise configuring a new rule for the new database to be added to the updated rules as configured for accessing databases from each of the one or more other applications and the first application.

15. The computer-readable medium of claim 14, wherein the instructions further include instructions which when executed by the one or more processors cause the one or more processors to perform operations, including:
dynamically configuring, by the VM manager, the particular VM to allow the application to run on the particular VM to access the one or more databases, wherein the VM manager manages lifecycles of a plurality of VMs running in an application network segment of a network, wherein each VM from the plurality of VMs hosts at least one application that consumes resources from a database network segment of the network.

16. The computer-readable of claim 14, wherein retrieving the information identifying the one or more databases accessible to the application comprises:
requesting, from the database manager, the information by providing an identifier of the account associated with the application, wherein the received instruction to run the application includes information identifying the account associated with the application; and
in response to receiving the information identifying the one or more databases, generating the configuration instructions by creating the rules to include network addresses of the one or more databases and routing information for accessing at least one network where the one or more databases reside.

17. A system comprising
a computing device; and
a computer-readable storage device coupled to the computing device and having instructions stored thereon which, when executed by the computing device, cause the computing device to perform operations, the operations comprising:
receiving, by a virtual machine (VM) manager, an instruction to run a first application;
retrieving, by the VM manager and from a database manager, information identifying one or more databases accessible to the first application, wherein the one or more databases are associated with an account of the first application, wherein the first application runs in an application network segment including a plurality of applications, and wherein the one or more databases run in a database network segment, wherein the application network segment and the database network segment are part of a cloud environment;
sending, by the VM manager, configuration instructions to dynamically configure a particular VM at which the first application is to run, wherein the particular VM is configured based on the configuration instructions, wherein the configuration instructions are generated based on the retrieved information and include rules for accessing the one or more databases identified in the retrieved information, wherein the rules identify each database by its respective network address, and wherein the rules cause the particular VM to allow the first application to access the one or more databases;
receiving, by the VM manager and from a database manager, a first notification indicating that a new database has been added in the database network segment, wherein the new database is configured for accessing based on requests received from applications associated with the account of the first application;
in response to receiving the first notification, sending, by the VM manager, instructions to update rules associated with one or more other applications, the one or more other applications being deployed at the application network segment and being associated with the account of the first application; and
updating the rules configured at each of the one or more other applications and the first application, and wherein updating the rules comprise configuring a new rule for the new database to be added to the updated rules as configured for accessing databases from each of the one or more other applications and the first application.

18. The system of claim 17, wherein the computer-readable storage device further stores which, when executed by the computing device, cause the computing device to perform operations, including:
dynamically configuring, by the VM manager, the particular VM to allow the application to run on the particular VM to access the one or more databases, wherein the VM manager manages lifecycles of a plurality of VMs running in an application network segment of a network, wherein each VM from the plurality of VMs hosts at least one application that consumes resources from a database network segment of the network.

19. The system of claim 17, wherein retrieving the information identifying the one or more databases accessible to the application comprises:
requesting, from the database manager, the information by providing an identifier of the account associated with the application, wherein the received instruction to run the application includes information identifying the account associated with the application; and
in response to receiving the information identifying the one or more databases, generating the configuration instructions by creating the rules to include network addresses of the one or more databases and routing information for accessing at least one network where the one or more databases reside.

* * * * *